United States Patent [19]
Kanoh

[11] Patent Number: 6,101,551
[45] Date of Patent: *Aug. 8, 2000

[54] MULTI-PROCESSOR SYSTEM FOR SUPPORTING MULTICASTING COMMUNICATION AND INTER-MULTIPROCESSOR COMMUNICATION METHOD THEREFOR

[75] Inventor: Yasushi Kanoh, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/845,766

[22] Filed: Apr. 28, 1997

[30] Foreign Application Priority Data

Apr. 30, 1996 [JP] Japan ................................. 8-109059

[51] Int. Cl.[7] ................................. G06F 15/16
[52] U.S. Cl. ..................... 709/245; 709/213; 709/216
[58] Field of Search ............................ 711/202, 205, 711/207, 220, 203; 395/200.43, 200.46, 200.75; 709/213, 216, 245

[56] References Cited

U.S. PATENT DOCUMENTS 5,437,017  7/1995  Moore et al. ..................... 395/200.43
5,504,872  4/1996  Tanaka ................................. 711/203
5,790,804  8/1998  Osborne ........................... 395/200.75

*Primary Examiner*—Zarni Maung
*Assistant Examiner*—Patrice Winder
*Attorney, Agent, or Firm*—Foley & Lardner

[57] ABSTRACT

A packet is held in a FIFO memory through a network. The packet includes a header and data. The header includes fields of a packet type, a data length, and a designation for a processor. The packet type field defines whether its packet is either a single-cast packet or a multi-cast packet and a designation method for a destination address. There are several methods for the destination address: first, a method using a message buffer in a memory, secondly, a method using a value of an address register previously set, and thirdly, a method designating as a destination address. The (original) entity of the address register may be reserved in the memory. In this case, different message buffers for every task identifier may also be reserved in the memory.

17 Claims, 6 Drawing Sheets

MULTI-PROCESSOR SYSTEM FOR SUPPORTING MULTICASTING COMMUNICATION AND INTER-MULTIPROCESSOR COMMUNICATION METHOD THEREFOR

BACKGROUND OF THE INVENTION

The present invention relates to a multi-processor system and an inter-processor communication method therefor, more particularly, to a multi-processor system for supporting a multicasting communication to transfer the same data from one processor to a plurality of processors, in a system in which the plurality of processors are connected by an inter-processor network and an inter-multi-processor communication method therefor.

In a conventional multi-processor system having a plurality of processors connected to each other, each processor comprises a CPU (central processing unit), a memory, a receiver and a transmitter. Each of the plurality of processors perform a communication through a network mutually connecting them.

A multicasting communication for transferring the same data from one processor to the designated processors has been frequently used in a parallel program. For an inter-processor network supporting the multicasting communication, various kinds of inter-processor networks have been known. For example, a switch in the inter-processor network generates a copy for one packet supplied from an input port and outputs it to a plurality of output ports. Thus, the same packet will be sent to a plurality of destination processors.

In the multicasting communication, the data is transferred to the specified processor that is previously designated, unlike a broadcast to transfer the data to all of the processors. Consequently, when the multicasting communication is performed, the destination processor must be designated.

In the packet for the multicasting communication, the destination processor can be represented as a range of the processor number expressed by the upper and lower limits. Furthermore, all of paths leading to the destination processors, for example, can be displayed on the packet. In addition, there is also an example that using a bit array corresponding to each processor, the destination processor is designated by asserting only bits corresponding to the destination processor.

On the other hand, there is the following method for a destination address in each destination processor. For example, the same address is used for each processor and only one address is designated. As another example, an area for a message buffer is provided in each processor, and the data by the multicasting is stored in this message buffer for a while.

However, in each processor, the same data is not always reserved in the same address. Particularly, addresses of the data dynamically reserved are known only in an execution time, because the addresses are determined by status of the processor. Furthermore, in the case where the message buffer is used, the data can be transferred to different addresses. However, it is necessary to copy the data from the message buffer into the destined data area. Since the copy requires the processing by a CPU, a high-speed receiving processing cannot be performed.

SUMMARY OF THE INVENTION

In view of the foregoing problem, of the conventional system, an object of the present invention is to utilize the multicasting communication in the multi-processor system flexibly. Furthermore, another object of the present invention is to process the multicasting communication at high speed.

In a multi-processor system according to a first aspect of the present invention, a processor supporting for a multicasting communication according to the present invention receives a packet including address information and data, and stores the data in a predetermined area in a memory based on said address information. The address information designates a register holding an address of the predetermined area.

With the unique and unobvious structure of the present invention, the multicasting communication is utilized in the multi-processor system flexibly.

BRIEF DESCRIPTION OF THE DRAWINGS

The above-mentioned and other objects, features and advantages of this invention will become more apparent by reference to the following detailed description of the invention taken in conjunction with the accompanying drawings in which.

DETAILED DESCRIPTION OF THE PREFERRED EMBODIMENTS

A multi-processor system in accordance with preferred embodiments of the present invention will be described in detail with reference to the accompanying drawings.

Figure 1:
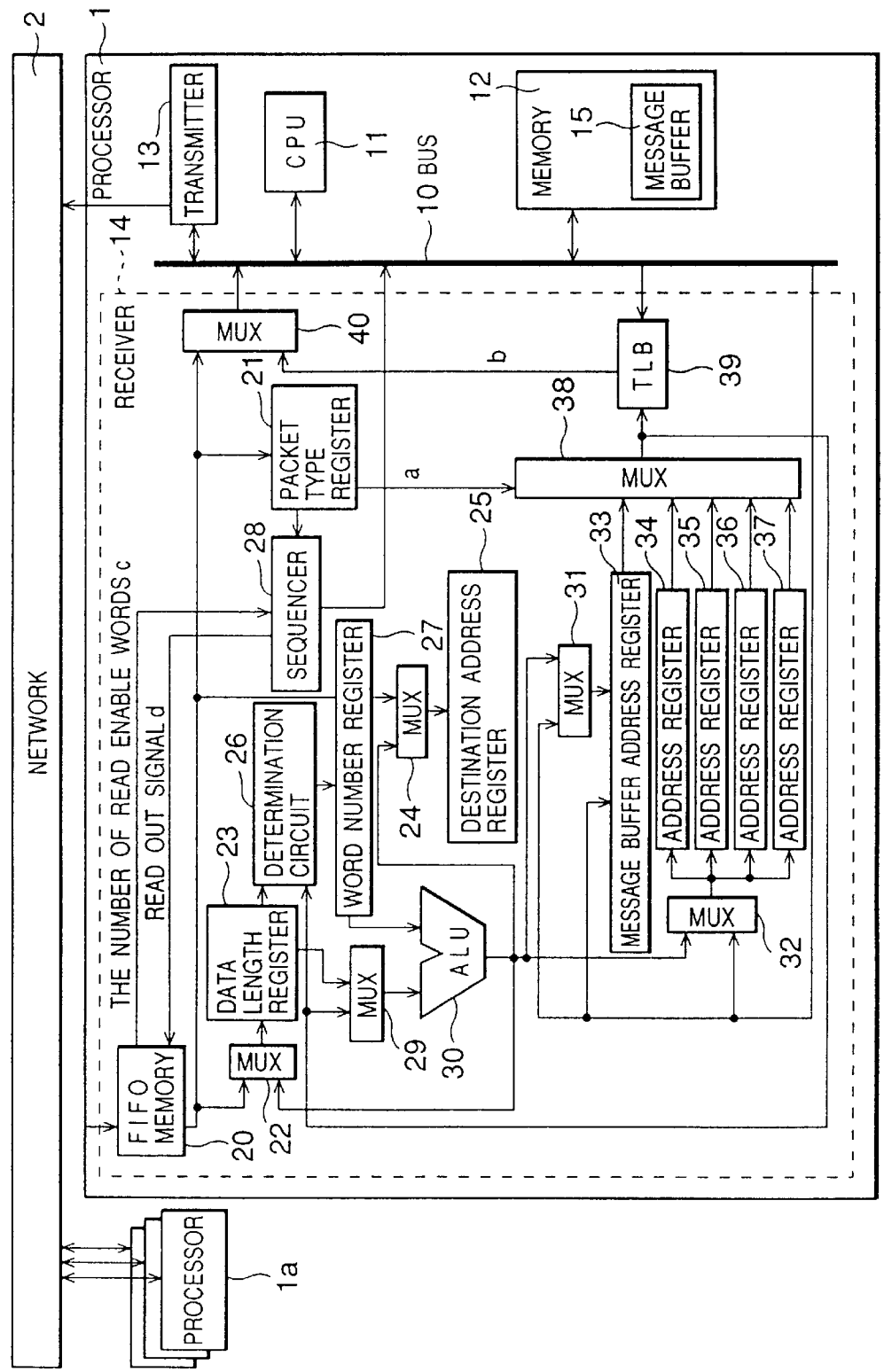
FIG. 1 is a block diagram showing the configuration of a multi-processor system according to an embodiment of the present invention.

Referring to FIG. 1, a multi-processor system of a first embodiment of the present invention includes a plurality of processors 1 and 1a. These processors 1 and 1a are coupled to each other by a network 2. These processors 1 and 1a have the same configuration, in which a CPU 11, a memory 12, a transmitter 13 and a receiver 14 are mutually connected by a bus 10.

The receiver 14 includes a FIFO memory 20 for receiving a packet from the network 2 to temporally store it therein, a packet type register 21 for storing information in a header portion of the packet, a data length register 23, a destination register 25, a word number register 27 for registering the number of writing words, a message buffer address register 33, a register group having address registers 34 to 37, a sequencer 28, a determination circuit 26 for determining the number of write words, an arithmetic logic unit (ALU) 30, a translation look-aside buffer (TLB) 39, and multiplexers (MUX) 22, 24, 29, 31, 32, 38, and 40 controlled by the sequencer 28.

The data length register 23 stores the content of a data length field in the packet output from the FIFO memory 20 as an initial value of the number of the words and is updated according to the succeeding transfer to hold the number of remaining words. The destination address register 25 stores the destination address when it is added to the packet. The determination circuit 26 determines the number of words to be written to the memory 12 according to the write address and packet length. The determination circuit 26 stores the number of words in the register 27 of the number of write words.

Generally, concerning access to the memory 12, the upper limit (L) of the number of words to be written at a time is limited depending on how many words of the leading addresses are there on the boundary.

Generally, concerning access to the memory 12, a target region is the set of contiguous addresses which has the same upper bits of the address. The size of the target region is, for example, a cache line size (i.e., 8 words) and so on. The size depends on the memory system. The upper limit (L) of the number of words to be written at a time is determined by the number of the words between the start address and the boundary of a target region. Furthermore, when the number of remaining words (R) of the packet is below the upper limit, only the number of remaining packet words can be written. Since writing to the memory is accompanied by an overhead processing such as a bus arbitration, the number of write words must be determined so as to reduce the number of times of writing as small as possible. Adding such conditions, the circuit 26 for determination of the number of write words determines the number of write words. More specifically, when the R words are to be written, if the formula R<L holds, the number of maximum words capable of being written at one write processing, the number of maximum words being determined by the write address, is regarded as the number of write words. If the formula R≧L holds, the L words are regarded as the number of words.

The ALU 30 is used for computing such as the next write address and the remaining packet length. The multiplexers (MUX) 22, 24, 29, 31, 32, 38 and 40 are controlled by the sequencer 28. The translation look-aside buffer (TLB) 39 converts the logical address from the MUX 38 to the physical address "b".

When the message buffer 15 that is an area in the memory 12 is destined, the message buffer address register 33 holds its memory address. In the message buffer address register 33, the predetermined high order bit portion represents the base address of the message buffer 15, and only the low order bit portion is updated by the output from the ALU 30. Therefore, the low order bit portion is implemented by a ring buffer in which, for example, when the final storing processing for the message buffer 15 is finished, the storing processing is again begun for the head thereof.

The address registers 34 to 37 hold addresses in the memory to which the data in the packet is written. These address registers 34 to 37 are set by a program in the processor on the receiver side.

The address used when the data in the packet is written to the memory is designated by the packet type fields in the packet. The packet type field are stored in the packet type register 21, and are selected among values of the designation address register 25, the message buffer address 33 and the four address registers 34 to 37 by the MUX 38, based on the write address selection signal "a".

The sequencer 28 reads out the packet reaching thereto from the FIFO memory 20, based on the information in both of the packet type field and the circuit 26 for determination of write words, whereby the sequencer 28 controls the write processing for the memory 12. Here, when it is assumed that the write address is a logical address, the logical address is converted to the physical address "b" using the TLB 39. This physical address "b" is output onto the bus 10 as the memory address.

Figure 2:
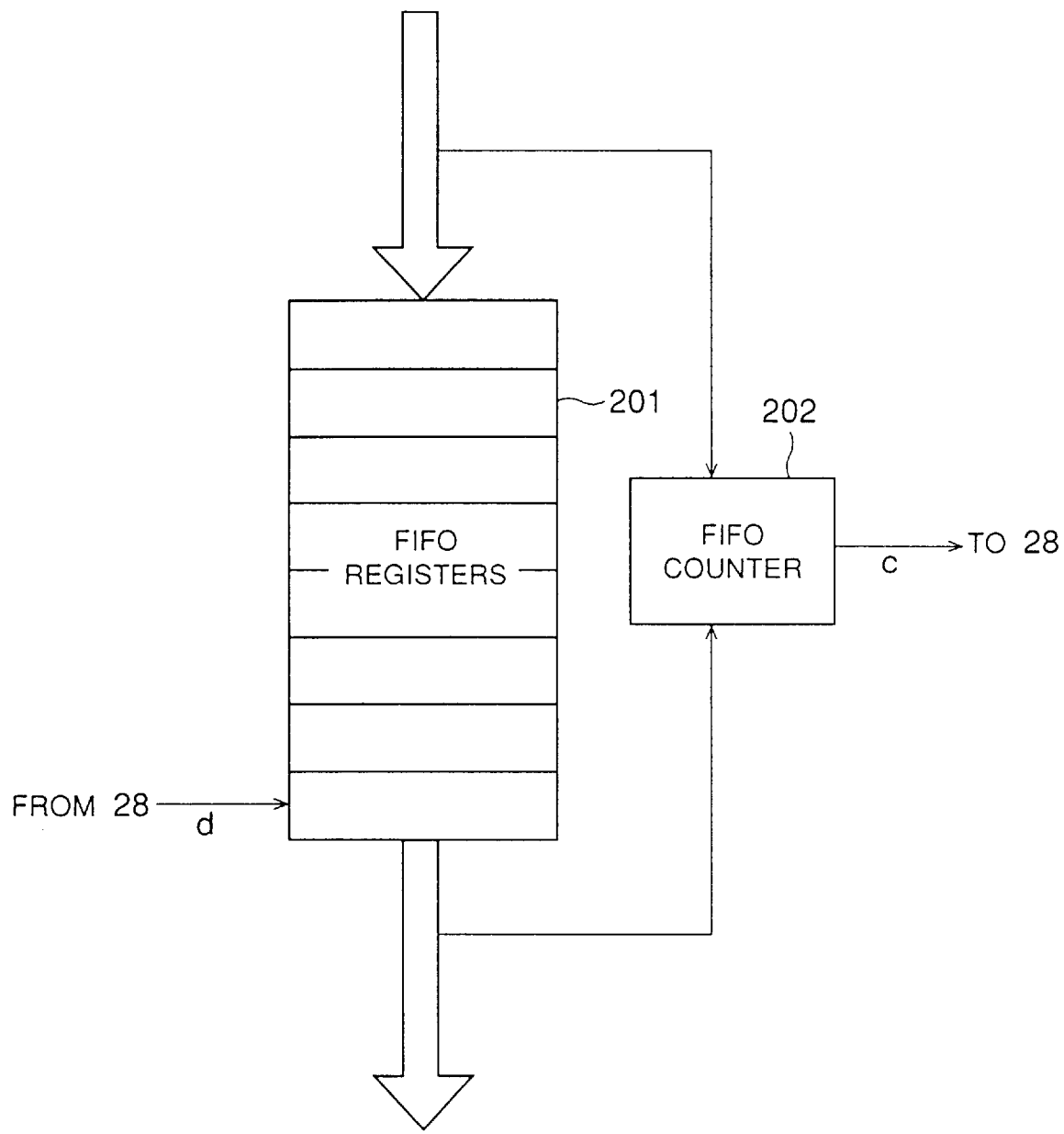
FIG. 2 is a schematic view showing a configuration of a FIFO buffer 20 in the present invention.

Referring to FIG. 2, the FIFO memory 20 includes a FIFO register 201 and a FIFO counter 202. The FIFO register 201 sequentially stores the packet received from the network 2 therein, and outputs the packet in, so called, a first-in first-out manner, in response to the read out signal "d" from the sequencer 28. The FIFO counter 202 is incremented at the time when one word of the packet is stored in the FIFO register 201, and is decremented when one word of the packet is output. The value of the FIFO counter 202 is output to the sequencer 28 as the number of read enable words "c".

Figure 3:
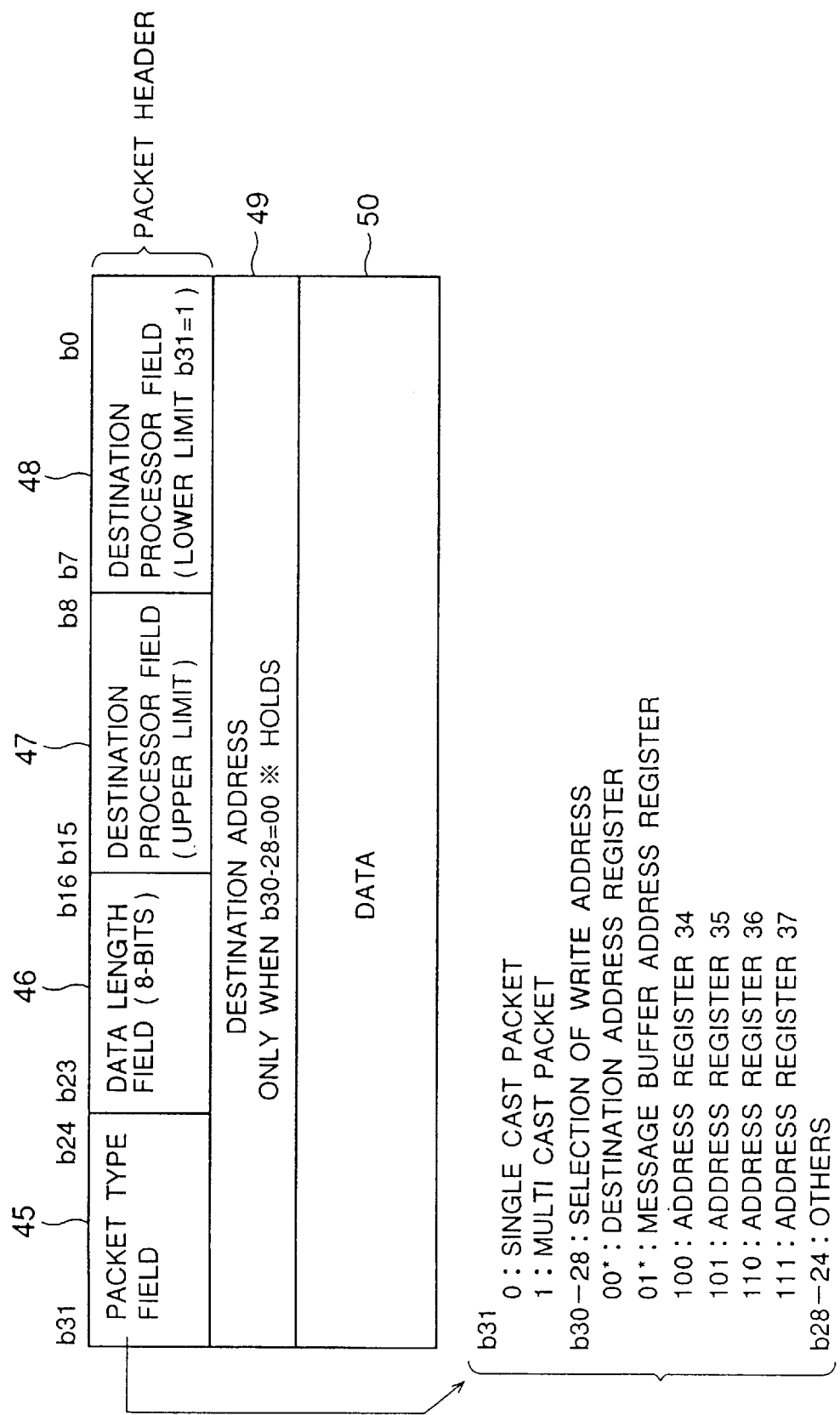
FIG. 3 is a diagram showing a configuration of a packet in the first embodiment of the present invention.

Referring to FIG. 3, for the form of the packet in the first embodiment of the present invention, the packet type field 45 includes one bit showing whether it is a packet sent to one destination processor (a single-cast packet) or a packet sent to a plurality of destination processors (a multi-cast packet), three bits for selecting the address register to which the date received by the destination processor is written, and four bits for other information.

Furthermore, the packet includes a data length field 46 having 8 bits which indicates the length of the data (the number of words) transferred by the packet, a field 47 having 8 bits which indicates the destination processor in the case of the single-cast and indicates the upper limit processor in the case of the multi-cast, and a field 48 having 8 bits indicating the lower limit processor in the case of the multi-cast. 32 bits from the packet type field 45 to the field 48 are called a packet header.

When the destination address is selected among the selection bits of the write address in the packet type field 45, the destination address 49 is stored followed by the packet header. The destination address 49 represents an immediate address. Thereafter, the data 50 in accordance with the number of words indicated by the packet length follows.

Next, an operation of the first embodiment of the present invention at the time of receiving the packet will be described with reference to the accompanying drawings.

Figure 4:
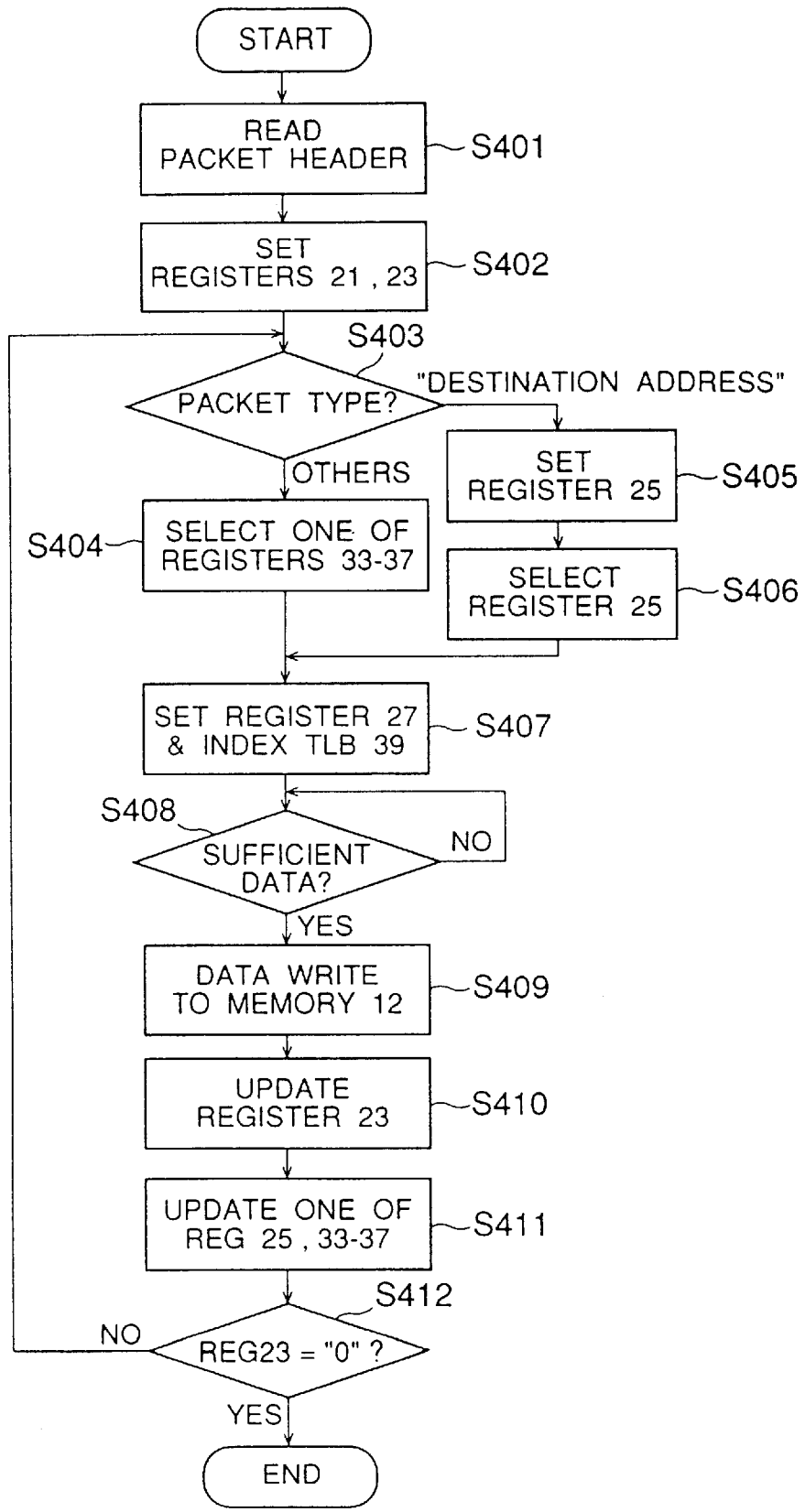
FIG. 4 is a flow chart showing an operation performed in the first embodiment of the present invention.

Referring to FIGS. 1 and 4, the packet arriving to the processor 1 from the other processor 1a through the network 2 is stored in the FIFO memory 20 in the receiver 14. Upon arrival of this packet to the processor 1, when a signal of the number of read enable words "c" arrives to the sequencer 28 from the FIFO memory 20, the sequencer 28 supplies the read out signal "d" from the FIFO memory 20, whereby the sequencer 28 reads out one word corresponding to the packet header (Step S401). The read out content of the packet type field 45 in the packet header is stored in the packet type register 21. Moreover, the content of the packet length field 46 showing the length of the data is stored in the data length register 23 through the MUX 22 (Step S402).

The packet type register 21 supplies the write address selection signal "a" to the MUX 38, depending on the stored packet type. The MUX 38 selects the write address among outputs from the destination address register 25, the message buffer address register 33 and the address registers 34, 35, 36 and 37 (Step S404 or S406).

When the write address selection field (b30-28) which is used for the selection of the write address stored in the packet type register 21 shows the selection of the destination address register 25 (Step S403), the sequencer 28 reads out the destination address 49 from the FIFO memory 20, and stores the destination address 49 in the destination address register 25 via the MUX 24 (Step S405).

The lower bits of the write address selected by the MUX 38 is input to the determination circuit 26. The determination circuit 26 determines the number of words written to the memory 12 depending on the lower bits of the write address and the data length supplied from the data length register 23, and the determination circuit 26 stores the number of determined words in the register 27 of the number of write words (Step S407).

Concurrently with the determination of the number of write words by the determination circuit 26, the sequencer 28 converts the output write address of the MUX 38 to the write physical address "b" using the TLB 39 (Step S407). If there exists no information required to translate the write address in the TLB 39, the sequencer 28 reads out the information required for translation from the page table on the memory 12 and stores this information in the TLB 39 via the bus 10.

In the above-described manner, when the number of write words and the write physical address "b" are obtained, the sequencer 28 waits until the number of read enable words "c" from the FIFO memory 20 reaches the number of write words (Step S408). When the number of read enable words "c" exceeds the number of write words, the sequencer 28 issues the memory write request accompanying the write physical address "b" and the number of write words against the bus 10. When the write request is accepted by the bus 10, the sequencer 28 outputs the read out signal "d" to the FIFO memory 20, whereby the sequencer 28 reads out the data in accordance with the number of write words from the FIFO memory 20. This read out data is written to the memory 12 through the MUX 40 and the bus 10 (Step S409). Simultaneously with the write to the memory 12 of the read out data, the sequencer 28 prepares for the next data write to the memory 12. That is, using the ALU 30, the number of words in the register of the number of write words 27 which has been written this time is subtracted from the value of the data length register 23, whereby the value of the data length register 23 is controlled so as to be updated (Step S410).

Then, the sequencer 28 adds the value of the register 27 of the number of write words to the value of the address register selected among the address registers 34 to 37 using the ALU 30, whereby the next write address is computed and the value of the selected address register is controlled so as to be updated (Step S411). Thereafter, the number of write words is determined according to the updated write address and the number of remaining packet words, in the same manner as in the last determination processing, and the data is written to the memory 12 in the same manner as in the last write processing. The sequencer 28 repeats these processings until the number of remaining packet words in the data length register 23 becomes "zero" (Step S412).

Next, processings according to the first embodiment of the present invention, prior to receipt of the packet, will be described with reference to FIG. 1, in detail. When the system is initialized, the operating system (OS) allocates the message buffer 15 to a certain area in the memory 12, and at the same time, sets its leading address to the message buffer address register 33.

The address registers 34 to 37 are set by the user program. Since the programmer understands the flow of the program, the programmer describes the program which previously sets the address as the write address for receiving the data arriving at the address register to be selected.

As described above, according to the first embodiment of the present invention, in the multi-cast communication, even when the area reserved in the destination processor are different depending on the destination processor, the address in that area can be previously set in the address registers 34 to 37, whereby the communication overhead is reduced. Moreover, the message buffer 15 contributes to the flexible processings.

Next, a second embodiment of the present invention will be described with reference to the drawings.

Figure 5:
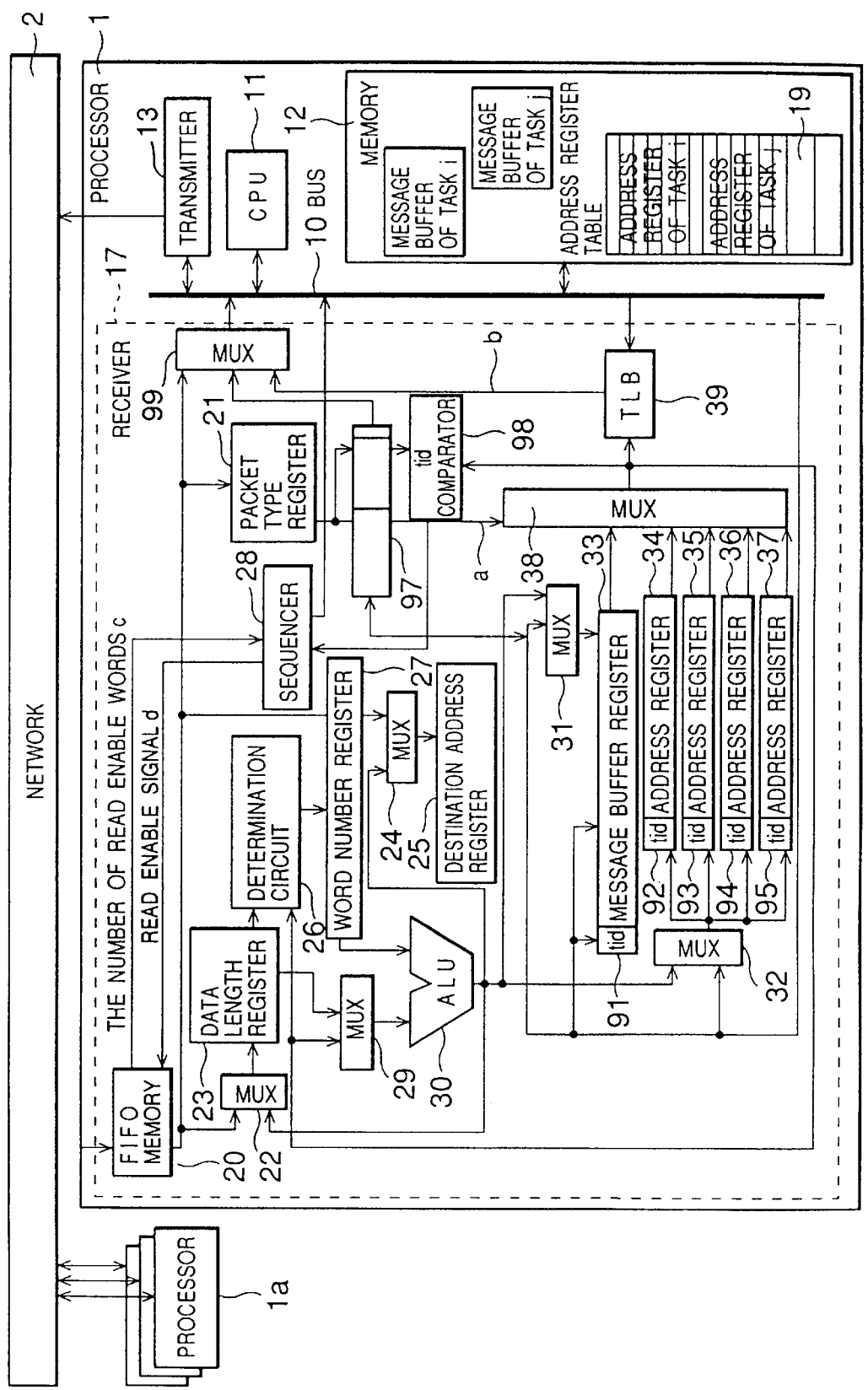
FIG. 5 is a block diagram showing a configuration of a second embodiment of a multi-processor system of the present invention.

Referring to FIG. 5, a multi-processor system of the second embodiment of the present invention has the same configuration as that of the first embodiment. The multiprocessor of the second embodiment is different from that of the first embodiment in that a task identifier (task ID; tid) is added to the message buffer address register 33 and the address registers 34 to 37, the memory 12 includes an address register table 19, and an address register table address register 97 for pointing the entry of the address register table 19 is included in the multi-processor system of the second embodiment. The multi-processor system of the second embodiment is premised on that there are many user tasks simultaneously executed by one processor 1. The message buffer is individually included in the memory 12 for every task.

In the second embodiment, the packet includes the task ID in the packet header. The address register table address register 97 stores the task ID included in the packet header.

Each of the message buffer address register 33 and the address registers 34 to 37 in the receiver 17 has a role as a cache memory for the address register table. A task ID comparator 98 compares the task ID 91, 92, 93, 94 and 95 added to the corresponding one of the foregoing registers with the destination task ID stored in the task ID field in the address register table address register 97, and uses the value of that register when the destination task ID coincides with one of the task ID 91, 92, 93, 94 and 95. If the destination task ID coincides with none of the task ID 91, 92, 93, 94 and 95, the address table register 19 in the memory 12 is accessed based on the value of the address table address register 97, and the values of the necessary address registers are set in the address registers 33, 34, 35, 36 and 37 in the receiver 17. The value of the task ID field in the address table address register 97 is set in the task ID 91, 92, 93, 94 and 95 contiguous to that address register.

Since the original of the address register of each task is present in the address register table 19 in the memory 12, upon completion of the processing for one packet the contents of the address registers 33 to 37 in the receiver 17, which is selected, must be written to the address register in the memory 12. The reason for this is that since the contents of the address registers 33 to 37 are updated so as to indicate the start address for the next transfer, the newest value must be reflected in the address register table 19.

Figure 6:
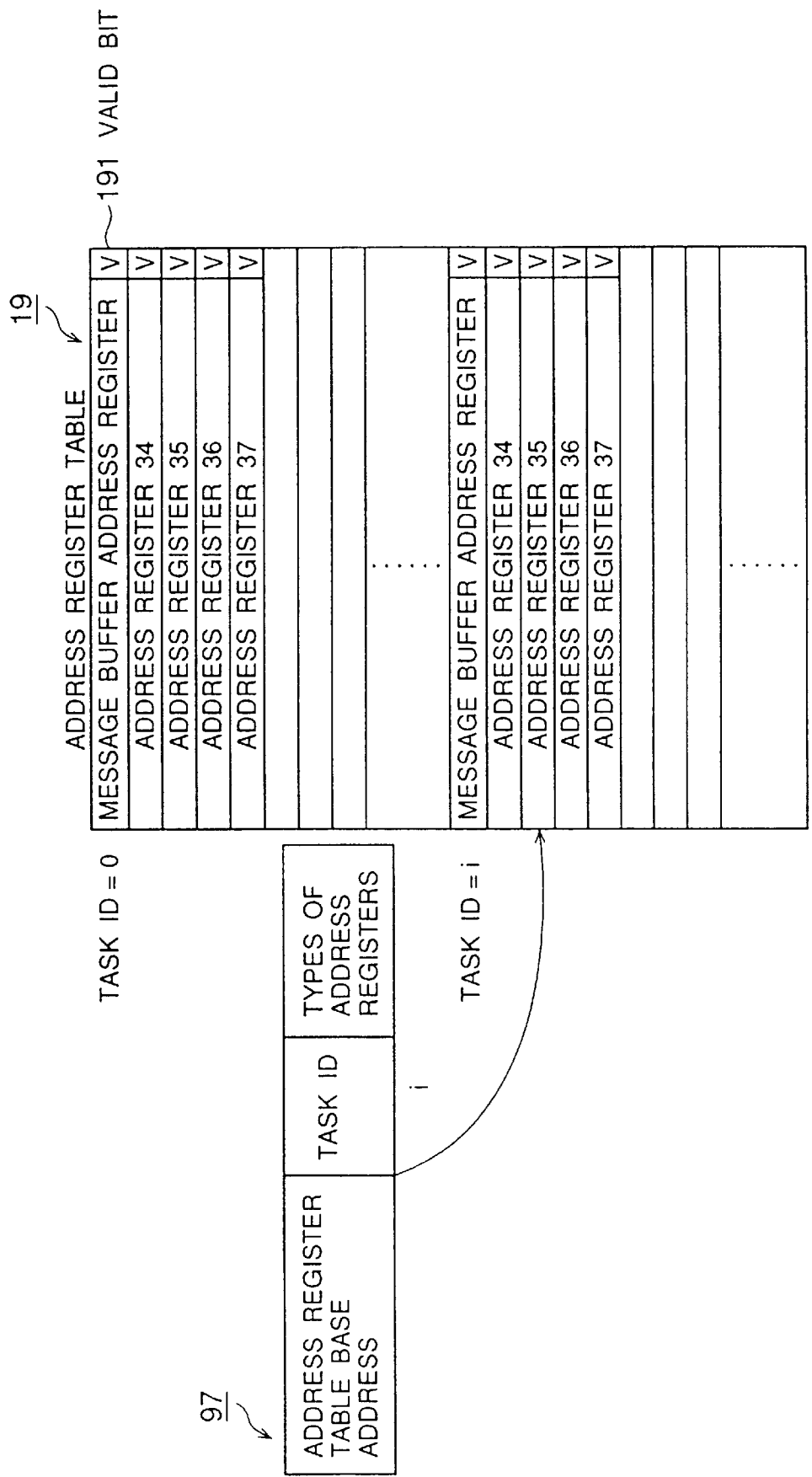
FIG. 6 is a diagram showing a configuration of an address register table in the second embodiment of the present invention.

Referring to FIG. 6, the address register table 19 in the second embodiment of the present invention is indexed by the address table base register 97. The valid bit 191 is added to the entry of each address register, which indicates whether the address register is effective or not. In the case where the designated address register is not effective, the packet is processed as an error.

Thus, according to the second embodiment of the present invention, even when there are the plurality of user tasks that are simultaneously executed in one processor 1, the multicasting communication can be efficiently executed.

As described above, according to the present invention, even when the write addresses in the plurality of destination processors are different from each other, the multicasting communication of the network is utilized, so that the chances to use the multicasting function of the network increase and the function of the network can be fully utilized.

Moreover, according to the present invention, even in circumstances of the multi-task in which the plurality of user tasks are simultaneously executed, the multicasting communication of the network is efficiently utilized.

While the invention has been described in terms of preferred embodiments, those skilled in the art will recognize that the invention can be practiced with modification within the spirit and scope of the appended claims.

What is claimed is:

1. A processor for receiving a packet including address information and data, and storing said data in a predetermined area in a memory based on said address information, wherein said address information designates a register holding an address of said predetermined area, and wherein said processor sets said address to said register on the side of said processor alone and further wherein said processor sets said address to said register before receipt of said packet.

2. The processor according to claim 1, wherein said address information further designates a fixed area in said memory.

3. The processor according to claim 1, wherein said address information further designates an immediate address in said memory.

4. The processor according to claim 1 wherein said register further holds a task identifier.

5. The processor according to claim 4, wherein said address information further designates an area allocated for every task in said memory.

6. The processor according to claim 4, wherein said address information further designates an immediate address in said memory.

7. A processor in a multi-processor system in which a plurality of processors are connected by a network, said processor including a receiver and a memory, said receiver comprising:

at least one address register for storing an address for a predetermined area in said memory;

an element which sets said address to said address register on the side of said receiver alone; and storing control means for receiving a packet having address information and data from said network and for controlling storing said data in the predetermined area in said memory according to said address information, said address information designating one of said address registers, wherein said element which sets said address to said address register processor sets said address before receipt of said packet.

8. The processor according to claim 7, said receiver further comprising:

a message buffer address register for designating an address of a message buffer in said memory, said address information designating said message buffer where said data is to be stored.

9. The processor according to claim 7, wherein said address information further designates an immediate address in said memory.

10. The processor according to claim 7, said receiver comprising:

a message buffer address register designating an address of a message buffer in said memory;

a destination register holding the immediate address of said memory designated by said address information; and a selector selecting one of said address registers, said message buffer address register and said destination register based on said address information, and wherein said storing control means controls storing said data in a predetermined area in said memory based on an address held in a register which is selected by said selector.

11. A processor in a multi-processor system in which a plurality of processors are corrected by a network, said processor including a receiver and a memory said receiver comprising:

at least one address register for storing an address for a predetermined area in said memory; and storing control means for receiving a packet having address information and data from said network and for controlling storing said data in the predetermined area in said memory according to said address information said address information designating one of said address registers;

said at least one register further holding a task identification data; and when task identification data of a task which is being executed agrees with the task identifier held in said address register, said storing control means uses the address register.

12. The processor according to claim 11, wherein:

said memory stores a message buffer individually for every task;

said address information designates said message buffer where said data is to be stored, said message buffer corresponding to a task which is being executed;

said receiver further comprises a message buffer address register holding a message buffer address in said memory and a task identifier; and said storing control means uses said message buffer address register when a task identifier of a task which is being executed coincides with the task identifier held in said message buffer address register.

13. The processor according to claim 12, wherein:

said memory holds, for every task, a first area for said at least one address register, and a second area for said message buffer address register;

a content of the first area is transferred to said at least one address register; and a content of the second area is transferred to said message buffer address register.

14. A multi-processor system in which a plurality of processors are connected by a network, each of said processors including a receiver and a memory, said receiver comprising:

at least one address register for storing an address for a predetermined area in said memory;

an element which sets said address to said address register on the side of said receiver alone; and storing control means for receiving a packet having address information and data from said network and for controlling storing said data in the predetermined area in said memory according to said address information, said address information designating one of said address registers, wherein said element which sets said address to said address register processor sets said address before receipt of said packet.

15. The multi-processor system according to claim 14, wherein said receiver comprising:

a message buffer address register designating an address of a message buffer in said memory;

a destination register holding the immediate address of said memory designated by said address information; and a selector selecting one of said address registers, said message buffer address register and said destination register based on said address information, and wherein said storing control means controls storing said data in a predetermined area in said memory based on an address held in a register which is selected by said selector.

16. A method of a multicasting communication for a packet including data, in a multi-processor system in which a plurality of processors are connected to each other by a network, each processor including a memory, said method comprising the steps of:

setting an address to which said data is stored, on the side of said processor alone which receives said packet;

transmitting said packet;

distributing said packet to a designated processor; and storing said data in the address set in said address setting step, in said designated processor, wherein said step of setting said address to which data is stored is performed before receipt of said packet.

17. The method of multicasting communication according to claim 16, said packet further including address information, wherein:

a plurality of addresses are set in said address setting step; and one of said plurality of addresses is selected based on address information in said data storing step.

* * * * *